United States Patent
Bischoff et al.

(10) Patent No.: US 6,244,955 B1
(45) Date of Patent: Jun. 12, 2001

(54) ROTARY TINE CONVEYOR FOR A HARVESTING MACHINE

(75) Inventors: Lutz Bischoff, Dellfeld; Fritz Lauer, Krähenberg, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/232,979

(22) Filed: Jan. 19, 1999

(30) Foreign Application Priority Data

Jan. 29, 1998 (DE) .............................................. 198 03 336

(51) Int. Cl.⁷ .............................. A01F 12/00; B02B 7/02
(52) U.S. Cl. .............................. 460/16; 460/25; 460/114; 460/81
(58) Field of Search .............................. 460/85, 114, 20, 460/70, 71, 16, 81, 84, 82; 56/16.4 R, 16.6

(56) References Cited

U.S. PATENT DOCUMENTS

| | | | |
|---|---|---|---|
| 976,306 | * 11/1910 | Sipler | 460/85 |
| 1,037,248 | * 9/1912 | Heinz | 460/85 |
| 1,547,476 | * 7/1925 | White | 460/85 |
| 2,557,226 | 6/1951 | Johnson | 130/27 |
| 2,670,845 | * 3/1954 | Busack et al. | 460/85 |
| 2,803,505 | 8/1957 | Oberholtz | 308/15 |
| 2,849,103 | 8/1958 | Scheffter et al. | 198/104 |
| 2,851,144 | 9/1958 | Carroll | 198/9 |
| 3,481,344 | * 12/1969 | Stokland | 460/81 |
| 4,790,128 | * 12/1988 | Klinner | 56/364 |
| 5,021,029 | * 6/1991 | Usick | 460/85 |

FOREIGN PATENT DOCUMENTS

| | | |
|---|---|---|
| 10 16 482 | 2/1956 | (DE) . |
| 1 904 406 | 1/1969 | (DE) . |
| 21 03 981 | 1/1971 | (DE) . |
| 81 22 977 | 8/1981 | (DE) . |
| 41 27 118 | 8/1991 | (DE) . |
| 0 567 192 | 10/1993 | (DE) . |
| 01 73 225 A1 | 8/1984 | (EP) . |
| 23 42 022 A1 | 2/1976 | (FR) . |
| 2315213 | 1/1977 | (FR) . |
| 2342022 | 9/1977 | (FR) . |
| 612962 | 11/1948 | (GB) . |
| 797686 | 7/1958 | (GB) . |

* cited by examiner

*Primary Examiner*—Robert E. Pezzuto
*Assistant Examiner*—Arpad Fabian Kovacs

(57) ABSTRACT

A rotary conveyor being disposed above the straw walkers of a combine is provided with a rotating body and disappearing tines. The rotary conveyor is an undershot conveyor and is designed to more aggressively loosen threshed crop material passing over the straw walkers. The tines are eccentrically supported in bearings. The tines can move radially in through tines guides that are located in recessed regions of the rotating body. The recessed regions being parallel to the transverse axis of the rotating body.

13 Claims, 3 Drawing Sheets

ROTARY TINE CONVEYOR FOR A HARVESTING MACHINE

BACKGROUND OF THE INVENTION

1. Field of the Invention

The invention is directed to a rotary tine conveyor having a rotating body having a plurality of tines. The rotating body is provided with a substantially closed outer circumferential surface and recessed regions through which the tines project. The freely rotatable tines are eccentrically supported in bearings. The recessed regions are provided with tine guides through which the tines project.

2. Description of the Prior Art

Several methods are known for the loosening and distributing a threshed crop mat in a combine. One example comprises grasping the crop and distributing it with a rotary conveyor equipped with rigid fingers. The rotary conveyor being located above the straw walkers of a combine. Known combines employ conveyors equipped with tines that perform undershot conveying or conveyors equipped with toothed rails that perform overshot conveying. DE-OS-41 27 118 proposes a rapidly rotating crop processing arrangement in the form of a conveyor belt equipped with tines that should supplement a following transverse straw walker in tearing apart the mat of threshed crop material.

The transverse straw walker can also be replaced by a rotary conveyor with movable tines that are supported eccentrically in bearings, as is known from DE-PS-1 904 406. In all cases the straw is loosened more intensively and for a longer period of time for a thorough separation of the remaining kernels. Due to the tearing apart of the mat of the threshed crop material, heavier crop components such as grain can escape through the gaps thus created.

SUMMARY

It is an object of the present invention to provide a rotary conveyor which eliminates numerous projections which can carry along the crop, for example, stalks, that can wrap itself around the rotary conveyor which limits the conveying capacity and the crop material is treated very harshly.

The rotary conveyor of the present invention comprises a rotating body with at least one tine supported in bearings eccentrically to it which can move radially with respect to the rotating body. The rotating body is provided an outer circumferential surface and recessed regions offset radially towards the interior of the rotating body. These recessed regions extend parallel to the longitudinal centerline of the rotating body. Tine guides are arranged in these recessed regions. The danger of wrapping by the crop is reduced, since the surface of the rotary conveyor exhibits fewer projections. Between the recessed regions the outer circumferential surface of the rotating body is configured with a circular contour being curved and smooth.

In the radially inward position of the tines, the free end of the tines is located below the outer circumferential surface defined by the rotating body. That is, the tines are retracted behind the circumferential surface of the rotating body, so that on the side on which the conveyed crop is delivered by the rotary conveyor the crop is not carried along. Thereby the material is treated very gently. The creation of recessed regions offset radially inward eliminates a radially inward extension of the tine guides, which leads to a clear saving of material, if the tine guides must be replaced after severe wear or damage by the crop.

The surface of the rotating body is formed by at least one metallic cover that is curved in such a way that it forms the outer circumferential surface and the recessed regions. The edges of the metallic cover extending parallel to the longitudinal centerline are accommodated on the shadow side located in the direction of rotation of the drum conveyor of the recessed regions. This reduces the danger that the crop can snag. If the surface of the rotating body is provided with several metallic covers, only one cover needs to be removeable for maintenance or repair work.

The tines are freely supported in bearings on a stationary axle that is coupled to two stub shafts by support arms. One of the stub shafts is supported in bearings in the drive flange of the rotating body. The fastening of the drive flange to one of the end faces of the rotating body automatically centers the stub shaft.

The tines are arranged at distances to each other in the direction of the axis of rotation of the rotary conveyor, in particular in such a way that starting with the first tine each three tines form a group and successive tines are offset to each other by 120 degrees. The offset of successive tines may vary depending on the application and may, for example, conform to the width of the straw walkers when used in a combine.

The rotary conveyor is installed above the straw walkers in such a way that above each individual straw walker a group of three tines is positioned.

The tines are alternately extended and retracted during one rotation of the rotating body about its longitudinal centerline. In this way the tines are able to take up and deliver the crop to be conveyed, for example, performing undershot conveying above the straw walkers of a combine.

In order to further reduce the danger that crop to be conveyed wraps itself around the rotary conveyor, a sheet metal deflector can be positioned on the rotating body. Due to the submergence of the tines it is possible to maintain a very small gap between the sheet metal deflector and the surface of the rotating body, so that crop to be conveyed is deflected efficiently. The sheet metal deflector can extend over the entire length of the side of the rotating body or it may consist of strips that keep the crop away from the surface of the rotating body only between the tines. The sheet metal deflector may also be positioned so close to the drum, that it can also tear off stalks that adhere to the drum.

If the sheet metal deflector is supported in bearings so as to pivot on the frame of a harvesting vehicle, it may be folded back by material that possibly nevertheless adheres and actuate a switch which releases a warning signal.

The rotary conveyor can be arranged in such a way that it is able to transport crop material both in overshot and in undershot conveying. In overshot conveying, for example, above the mower beam of a combine, the advantages resulting from the elimination of projections, such as the tine guides, become equally apparent as during undershot conveying.

DETAILED DESCRIPTION

Figure 1:
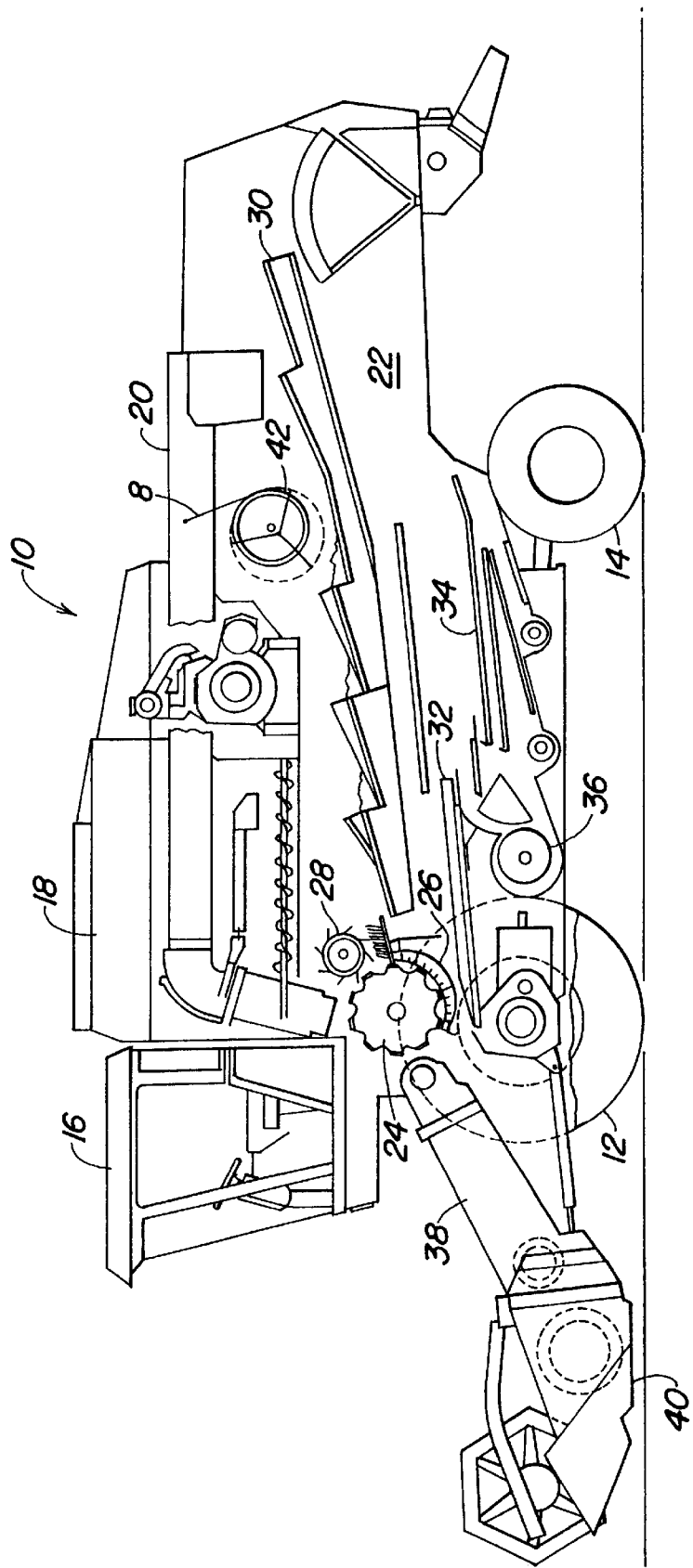
FIG. 1 is a semi-schematic side view of a combine having the rotary conveyor of the present invention.

FIG. 1 shows a harvesting machine 10 in the form of a combine with front driven and rear steerable wheels 12 or 14 and an operator's cab 16 from which it can be controlled by an operator. In place of a combine, the present invention could also be used on a stationary threshing machine, a pull combine, or the like. The operator's cab 16 is followed to the rear by a grain tank 18, that can deliver crop deposited in it to the outside through a discharge pipe 20. The grain tank 18 is supported on a frame 22, in which crop supplied to it is separated into its large and small components in its path over a threshing cylinder drum 24, a threshing concave 26 and a beater 28. On the following straw walkers 30, as well as on a grain pan 32 and sieves 34 further separation of the harvested crop is performed, where finally the threshed out grain is conveyed to the grain tank 18, the large remaining crop components (straw) are deposited on the ground over the straw walkers 30 and light remaining crop components (chaff) are blown from the sieves 34 by means of a blower 36 out the rear of the combine and onto the ground. The standing crop is first harvested by a platform 40. The harvested crop is conveyed by feederhouse 38 to the threshing cylinder 24 and concave 26.

A rotary conveyor 42 is arranged above the straw walkers 30. The rotary conveyor 42 rotates about a transverse axis to the direction of operation of the vehicle. The rotary conveyor 42 is used as supplementary separator and comprises a rotating body 44 and tines 84. The tines 84 are made of metal or plastic. Next to the rotating body 44 a sheet metal deflector 8 is located. This deflector 8 maybe pivotally attached to the frame 22.

As seen in FIG. 1, the rotary conveyor 42 rotates in the counterclockwise direction, so that undershot conveying is performed. For this purpose drive arrangements, not shown, are provided. For example, a belt pulley or a chain can be used to drive rotating body 44 which transmits a drive from a motor.

The rotary conveyor 42 is located preferably, but not absolutely, above the straw walkers 30 approximately halfway down the length of the straw walkers. This position can be varied vertically as well as horizontally by means of a corresponding guides.

Alternatively the rotary conveyor 42 could also be provided immediately downstream of the beater 28.

The drive arrangement can be configured in various ways and contain, for example, a gearbox that can be varied in speed and/or direction of rotation, by means of which the rotational speed of the rotary conveyor 42 can be varied and its direction of rotation can be reversed.

In this way the rotary conveyor 42 can be driven so as to perform overshot as well as undershot conveying. Where, if necessary, the position of the tines 84 must be adjusted to conform.

The preceding description shows that the configuration of the rotary conveyor 42 corresponds essentially to the configuration of the central region of a screw conveyor of a harvesting platform.

Figure 3:
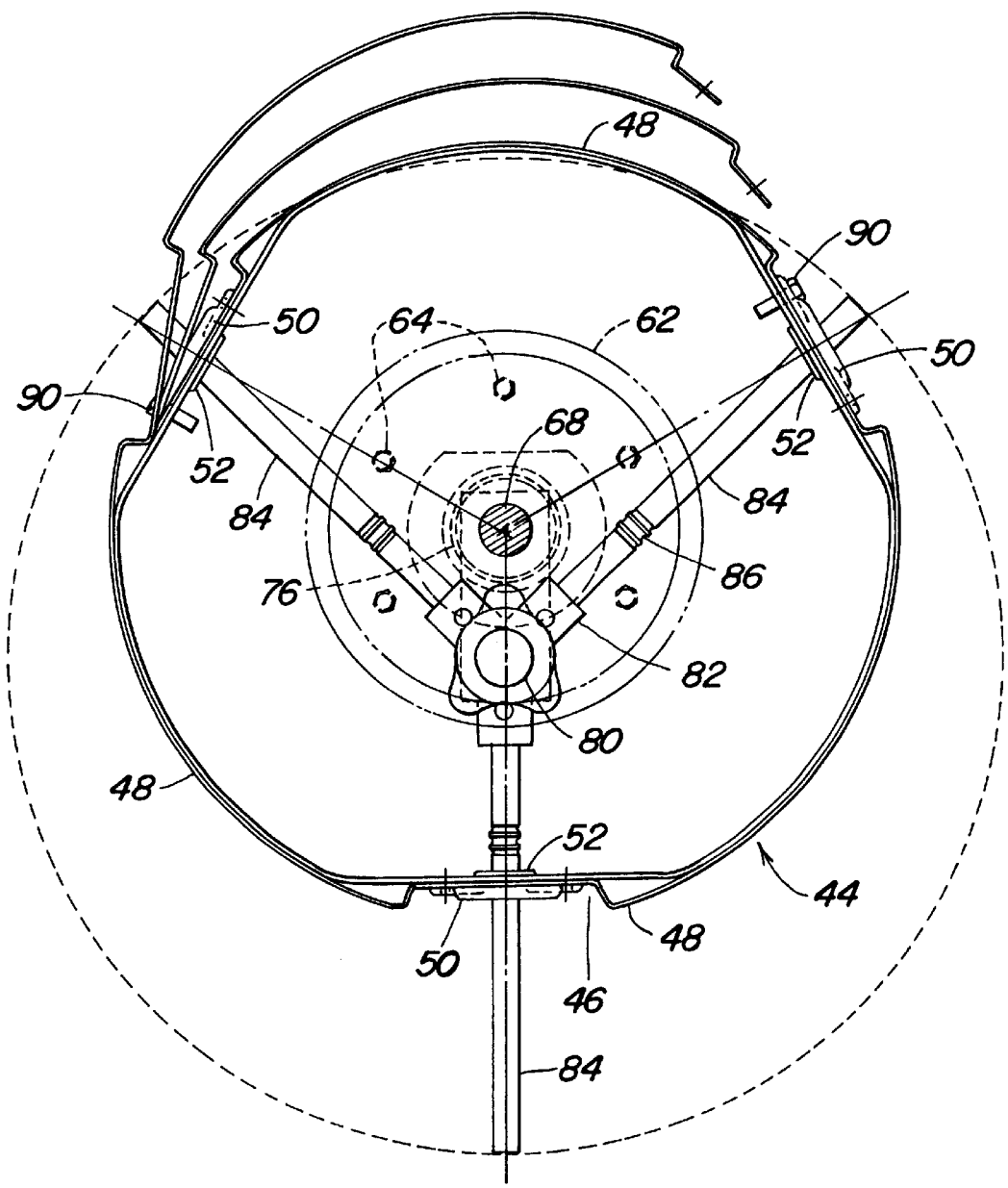
FIG. 3 is a side cross sectional view taken along line 3—3 in FIG. 2.

According to FIG. 3, the rotary conveyor 42 comprises a rotating body 44, whose surface is composed, in the present case, of three metallic covers 48. The metallic covers 48 are curved in such a way that they are provided with an outer circumferential surface and recessed regions 46 offset radially inward from the outer circumferential surface. The recessed regions extend parallel to the axis of rotation of the drum-shaped rotary conveyor 42. Tine guides 50, consisting of plastic or metal, and corresponding openings 52 are located in regions 46. The end edges of the metallic covers 48 that extend parallel to the axis of rotation disappear in the regions 46.

End face walls 54 and 56 of the rotating body 44 are formed by disks 58 and 60, one of which is provided with a bearing flange 62 that is fastened at six hexagonal disposed locations to the disk 58 by means of screws 64. The disks 58 and 60 are spotwelded to the inner side of two metallic covers 48 of the rotating body 44 and contain depressions on the side facing the interior of the rotating body 44. The rotating body 44 is supported on stub shafts 68. The right stub shaft 68 is connected to the bearing flange 62 and is provided with a keyway 70 for a gear.

The rotating body 44 contains a bearing arrangement that is arranged eccentrically and parallel to the axis of rotation of the rotating body 44 and that contains two stationary stub shafts 74, two support arms 76 and 78, and an axle 80. On the axle 80 two-piece clamps 82 are fastened at intervals which can pivot about the axle.

The tines 84 are configured as straight-line, massive and equally long rods having a circular cross section. They are provided with a breaking point 86. The tines 84 maybe arranged as trailing tines, that is trailing the direction of rotation, and, in principle, need not be as massive. The footings of the tines 84 are so configured that they fit into corresponding recesses in the clamps 82 and can be retained therein.

The tines 84 are arranged along the axle 80 in such a way that they offset at a fixed angle to each other, for example, 120 degrees and extend through the tine guides 50. The tines 84 extend to differing lengths through the openings 52 and the tine guides 50 in the rotating body 44 beyond it to the outside.

The axle 80 is rigidly connected by means of the support arms 76 and 78 with the stub shafts 74. The right stub shaft 74 is supported in bearings and free to rotate, in the bearing flange 62. The left stub shaft 74 is rigidly fastened outside the rotating body 44. Two roller bearings 4 and 6 allow for rotation of the rotating body 44 in a plane perpendicular to the longitudinal centerline 88, the disks 58 and 60 rotate about the stationary stub shafts 74. The axle 80 retains its position and the tines 84 are retracted and extended during a rotation of the rotating body 44 through the tine guides 50 that are laterally centered and located in the recessed regions 46. If a tine 84 is in its radially inward position, then its free end is retracted below the outer circumferential surface of the region defined by the rotating body 44 that is not recessed. The path described by the free ends of the tines 84 is shown in FIG. 3 in dashed lines.

The tine guides 50 are arranged in the recessed regions 46 and are screwed or riveted to the metallic covers 48 in two places in the direction transverse to the longitudinal centerline 88 to either side of the openings 52. The metallic covers 48 are connected to each other by screws 90 alongside each tine guide 50. Two of the three metallic covers 48 are rigidly welded to the disks 58 and 60. The third metallic cover 48 can be completely disassembled by removing the screws 90. The screws 90 are accommodated on the shadow side that lies in the direction of rotation of the rotating body 44 in the recessed regions 46.

Figure 2:
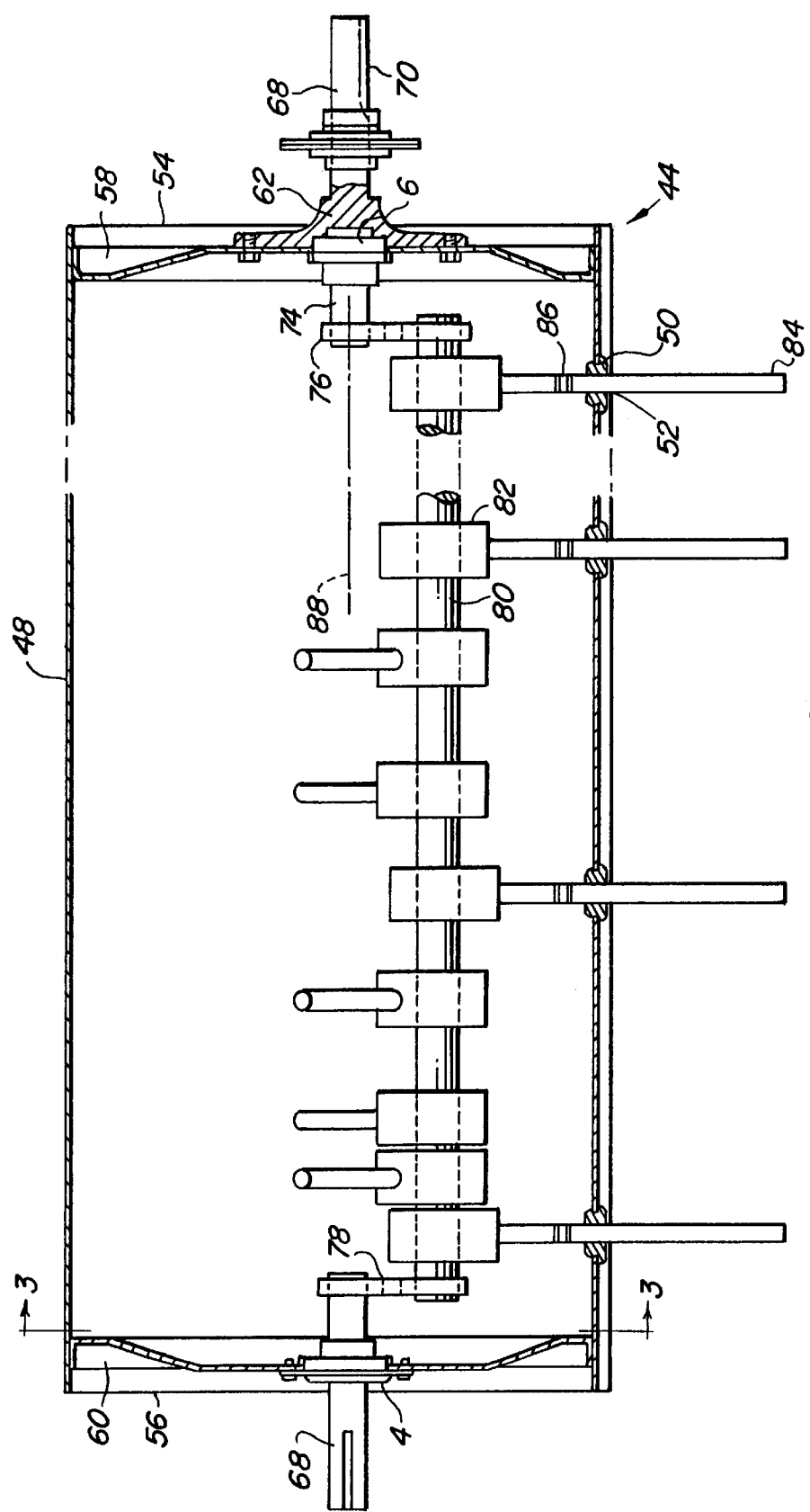
FIG. 2 is a front cross sectional view of the rotary conveyor of the present invention.

In addition, to the creation of recessed regions for the tine guides 50 and the screws, the employment of several metallic covers 48 according to FIGS. 2 and 3 has the advantage that it considerably simplifies the accessibility for assembly and maintenance. In order to make possible, for example, to access the clamps 82. It is only necessary to remove the screws of the metallic covers 48 which are not welded to the disks 58 and 60 in the recess in which the tine guide 50 is located. As is shown in FIG. 3 on the basis of two positions the metallic cover 48 is then spaced away from the circumferential surface.

Corresponding to FIG. 1 a sheet metal deflector 8 may be positioned on the rotating body 44 that is oriented in such a way that upon rotation of the rotating body 44 crop to be conveyed that has adhered to the rotating body 44 can be stripped off.

In an application of the rotary conveyor 42 in a combine the tines 84 may be arranged in such a way that they are located in groups of three tines 84 above an individual straw walker 30, that is, in a five-straw walker machine fifteen tines are applied and in a six-straw walker machine eighteen tines 84 are applied as is shown in FIG. 2. The three tines 84 located in each case ahead of the end face disks 54 and 56 of the rotating body 44 are spaced, in this example, at a smaller distance to each other than the remaining tines 84.

The invention should not be limited by the above described embodiment, but should be limited solely by the claims that follow.

We claim:

1. Rotary conveyor with a rotating body and at least one tine, where the rotating body is provided with an essentially closed outer circumferential surface and a transversely extending inner recessed region, the tine is eccentrically supported in the interior of the rotating body, the tine has a free end, the tine extends and retracts so as to move radially through a tine guide which is fastened to the transversed extending inner recessed region of the rotating body.

2. Rotary conveyor according to claim 1, characterized by the fact that the tine has a radial innermost position and a radial outermost position as it moves through the tine guide, at the radially innermost position of the tine the free end of the tine is located below the outer circumferential surface.

3. Rotary conveyor according to the claim 2, characterized by at least one metallic cover forms the circumferential surface of the rotating body and the metallic cover is provided with an edge which terminates in the recessed region.

4. Rotary conveyor according to claim 3, characterized by a stationary axle that carries a plurality of the tines and that is retained on two stub shafts and that one of the stub shafts is supported in bearings in a bearing flange of the rotating body.

5. Rotary conveyor according to claim 4, characterized by the plurality of tines are arranged and spaced at distances along a longitudinal centerline of the rotary conveyor, in such a way successive tines are each offset at 120 degrees to each other.

6. An agricultural combine having a frame and straw walkers, a rotary conveyor is arranged above the straw walkers and is provided with a rotating body and at least one tine, where the rotating body is provided with an essentially closed outer circumferential surface and a transversely extending inner recessed region, the tine is eccentrically supported in the interior of the rotating body, the tine having a free end, the tine extends and retracts so as to move radially through a tine guide which is fastened to the transversely extending inner recessed region of the rotating body.

7. An agricultural combine as defined by claim 6 characterized by the fact that the tine has a radial innermost position and a radial outermost position, when the tine is in its radially innermost position the free end of the tine is located below the circumferential surface defined by the rotating body not including the recessed region.

8. An agricultural combine according to the claim 7, characterized by at least one metallic cover forms the circumferential surface of the rotating body and the metallic cover is provided with an edge which terminates in the recessed region.

9. An agricultural combine according to claim 8, characterized by a stationary axle that carries a plurality of tines and that is retained on two stub shafts and that one of the stub shafts is supported in bearings in a bearing flange of the rotating body.

10. An agricultural combine according to claim 9, characterized by the plurality of tines are arranged and spaced at distances along a longitudinal centerline of the rotary conveyor, in such a way that successive tines are each offset at 120 degrees to each other.

11. An agricultural combine according to claim 6, characterized by the straw walkers being provided with a number of individual straw walkers and groups of three tines are arranged with each corresponding straw walker.

12. An agricultural combine according to claim 11, characterized by at least one sheet metal deflector is mounted to the frame and extends towards the rotating body.

13. An agricultural combine according to claim 12, characterized by the sheet metal deflector is located close to the rotating body and is pivotally mounted to the frame.

* * * * *

UNITED STATES PATENT AND TRADEMARK OFFICE
CERTIFICATE OF CORRECTION

PATENT NO. : 6,244,955 B1
DATED : June 12, 2001
INVENTOR(S) : Bischoff et al.

It is certified that error appears in the above-identified patent and that said Letters Patent is hereby corrected as shown below:

Column 5,
Line 27, delete "transversed" and insert -- transversely --

Signed and Sealed this

Fourth Day of June, 2002

Attest:

Attesting Officer

JAMES E. ROGAN
Director of the United States Patent and Trademark Office